United States Patent
Johnson et al.

[15] 3,637,524
[45] Jan. 25, 1972

[54] HALIDE ADDITION AND DISTRIBUTION IN THE REACTIVATION OF PLATINUM GROUP CATALYSTS

[72] Inventors: Marvin F. L. Johnson, Homewood; Stuart L. Graff, Calumet City, both of Ill.

[73] Assignee: Atlantic Richfield Company, New York, N.Y.

[22] Filed: July 11, 1968

[21] Appl. No.: 743,924

[52] U.S. Cl..............................252/415, 208/140, 252/416, 252/419
[51] Int. Cl. .......................................B01j 11/18, B01j 11/80
[58] Field of Search............................252/415; 208/140, 139

[56] References Cited

UNITED STATES PATENTS

| | | | |
|---|---|---|---|
| 2,916,440 | 12/1959 | Hogin et al. | 208/140 |
| 3,117,076 | 1/1964 | Brennan et al. | 208/140 |
| 3,243,384 | 3/1966 | Raarup, Jr. | 252/415 |
| 3,247,128 | 4/1966 | White et al. | 252/415 |
| 3,407,135 | 10/1968 | Brown | 208/139 |

*Primary Examiner*—Daniel E. Wyman
*Assistant Examiner*—P. E. Konopka
*Attorney*—Morton, Bernard, Brown, Roberts & Sutherland, John W. Behringer, James N. Dresser, Thomas J. Clough, Eugene L. Bernard, W. Brown Morton, Jr., Martin J. Brown, John T. Roberts and Malcolm L. Sutherland

[57] ABSTRACT

There is disclosed a method for reactivating a fixed bed of used platinum group metal-alumina catalyst of the type in which the alumina is derived from hydrous alumina predominating in alumina trihydrate. Such catalysts are employed in, for instance, the catalytic reforming of gasoline boiling range hydrocarbons to obtain fuels of high-octane ratings or aromatics. The method for reactivating the catalyst which has declined in activity during use and contains carbonaceous deposits, involves treating the deactivated catalyst at elevated temperatures with an oxygen-containing gas to burn the carbonaceous deposits therefrom. The relatively carbon-free catalyst is contacted under controlled conditions with a gaseous stream containing small amounts of chlorine, in combined or elemental form, oxygen and often water vapor to deposit chloride in a first portion of the catalyst bed. After the chlorine component is added to the catalyst, preferably in a relatively short period of time, the catalyst is then contacted with a gaseous stream containing oxygen and water vapor. This treatment may continue for a longer time than the chlorine treating period and until the chloride deposited on the catalyst is distributed through a major portion of the catalyst bed. Distribution of the chloride is a function of the time, temperature and water vapor partial pressure observed during the treatment and thus the distribution is controlled essentially by kinetics. The extent of water contact with the catalyst is limited by controlling the amount of water in the gaseous streams and the length of the overall treatment.

10 Claims, No Drawings

HALIDE ADDITION AND DISTRIBUTION IN THE REACTIVATION OF PLATINUM GROUP CATALYSTS

This invention pertains to the reactivation of a fixed bed of used, relatively carbon-free, platinum group metal-alumina catalyst whose alumina base is composed of activated or gamma-family alumina modifications resulting from the calcination of precursor hydrous alumina predominating in alumina trihydrate.

Catalysts composed essentially of a small amount of a platinum group metal supported on calcined or activated alumina are employed extensively on a commercial basis for promoting reactions conducted under reducing conditions, particularly in the presence of molecular hydrogen. The most prominent use of such catalysts is in the reforming of broad or narrow cuts of gasoline boiling range hydrocarbons derived from mineral oil sources to obtain fuels of higher octane rating than the feed or aromatic hydrocarbons. Straight run petroleum naphthas and their various fractions are most often employed as the feedstocks in the reforming operations. These catalysts may also be used to enhance other reactions in which hydrocarbons are converted under reducing conditions involving one or more of the reactions of isomerization, dehydrogenation, dehydrocyclization, hydrocracking and hydrogenation. Generally, the platinum group metal-alumina catalysts contain a small amount of chloride which is usually present in the catalyst due to the use of a chlorine-containing platinum compound, for instance, chloroplatinic acid, as the source of platinum in manufacturing the catalyst. The platinum of these types of catalyst is in its most active state when undetectable by present X-ray diffraction techniques, thereby indicating the presence of the metal in combined form or, if as elemental metal, in such finely divided state that its crystallite sizes are less than about 50 A.

During use of these platinum group metal-alumina catalysts they lose activity over a period of time, the length of which depends on such factors as the type of conversions being effected, reaction severity, extent of impurities in the feedstock and other conditions of use and regeneration. A portion of the hydrocarbon being converted forms a carbonaceous deposit on the catalyst in spite of the fact that the presence of molecular hydrogen in the reaction system reduces such deposition. Also, catalytic activity is lost during regeneration due to the growth of platinum group metal crystallites and the loss of chloride. The chloride in he catalyst contributes to its acidity and therefore the loss of chloride results in a reduction in this type of catalytic activity. Such activity in a controlled amount is desirable in many operations, for instance, in naphtha reforming.

Due to the various considerations the platinum group metal-alumina catalysts are employed as macrosize particles disposed as a fixed bed. Frequently a plurality of such reactors, each containing a fixed bed of the catalyst, is employed in series in reforming or other endothermic reaction systems and a heater for the charge stock precedes each reactor. Also the reactors can be employed in parallel relationship or in a swing reactor operation. In these systems the catalyst eventually loses sufficient activity that it is no longer desirable to continue processing the hydrocarbon feed. The catalyst is then regenerated by the removal of most of the carbonaceous deposit and, if desired, reactivated by other treatments which may redisperse larger platinum crystallites or increase the chloride content of the catalyst. In some systems the regeneration and reactivation are accomplished by taking all reactors off processing and performing the necessary regeneration and reactivation. In swing-type reactor systems the regeneration and reactivation can be done on an individual reactor basis. In a typical commercial operation, regeneration of the catalyst, that is, the removal of the major amount of the carbonaceous deposit, is effected more often that the reactivating procedures involving redispersion of platinum or the addition of chloride. Although, if desired, the catalyst can be both regenerated and reactivated each time it is removed from processing the hydrocarbon feedstock.

The platinum group metal-alumina catalysts are often relatively sensitive to deteriorating factors; however, the catalysts must maintain suitable activity and selectivity characteristics over extended hydrocarbon processing periods due to the high cost of such catalysts. It is therefore very important that the regeneration and reactivation operations be conducted in a most efficacious manner and quite frequently these operations must be varied depending on the type of platinum group metal-alumina reforming catalyst being used.

One commercial platinum group metal-alumina catalyst is prepared from a hydrous alumina precursor which predominates in trihydrate. Such catalysts are described, for instance, in U.S. Pat. Nos. 2,838,444 and 2,838,445 both herein incorporated by reference, and are macrosize particles essentially composed of calcined or gamma family-alumina modifications resulting from calcination of such precursors and containing a minor amount of, for instance, 0.05 to 2 weight percent of the platinum group metal. These catalysts even after extended use often have relatively high surface areas of at least about 150 square meters per gram and it is such catalysts to which the present invention pertains.

By this invention there has been devised a procedure whereby regenerated platinum group metal-alumina catalysts whose alumina is derived from hydrous alumina predominating in trihydrate, can be successfully reactivated through chloride addition and, if desired, platinum redispersion. This type of catalyst is particularly sensitive to deterioration in its activity and selectivity characteristics and must be treated properly during reactivation. In general the process of this invention involves the deposition of chloride in a portion of the fixed catalyst bed through treatment with a gaseous stream containing small amounts of a chlorine (Cl)-containing material, oxygen and often water vapor, and subsequently distributing the chloride through a major portion of the bed by continuing the gaseous treatment in the absence of further addition of the chlorine-containing material to the entering gas stream, and in the presence of oxygen and water vapor. The deposition of the chloride source on the portion of the catalyst bed is conducted under conditions which avoid water contact or hold it at a low level. The subsequent treatment of the catalyst bed is under conditions which provide for adequate chloride distribution without unduly deteriorating the surface area of the catalyst or producing excessive loss of chloride from the reactor which can give rise to equipment corrosion problems. Of course the loss of chloride from the catalyst is economically disadvantageous. Moreover, the total water contacting the catalyst during both chloride deposition and distribution is restricted depending on the temperatures employed.

We are aware that the addition of chlorine to platinum group metal-alumina catalysts has been the subject of several proposals in the past and one patent representative of such disclosures is U.S. Pat. No. 3,243,384 to Raarup. In the patent there is no indication that the catalyst involved was one in which its alumina content was derived from hydrous alumina predominating in trihydrate. From the conditions of chloride deposition employed in the method of the patent, it would be concluded that a catalyst of this type was not treated since the procedure described would be quite deleterious.

By the method of the present invention there is reactivated through chloride addition and, when desired platinum group metal redispersion, a fixed bed of used but regenerated platinum group metal-alumina catalysts whose alumina is derived from hydrous alumina predominating in trihydrate, by contact of the catalyst with a gaseous stream which is composed predominantly of inert gas such as nitrogen or flue gas and containing small amounts of oxygen, a chlorine-containing material in the vapor state, and, if desired, water vapor. Any water vapor present in the gaseous stream is such that the partial pressure of this component is zero to about 0.8 pounds per square inch absolute (p.s.i.a.). Often the water vapor content is at least about 100 p.p.m. (parts per million by volume). In any event the mole ratio of water to chlorine (Cl) in the vapor stream may be zero and does not exceed about 10:1, usually the water to chlorine ratio is at least about 0.5:1 or even at least about 1:1. The oxygen content of the chlorine-containing gaseous stream is such that the oxygen partial pressure is about 3 to 100 p.s.i.a., preferably about 5 to 50 p.s.i.a.

During treatment of the catalyst with the chlorine-containing gas the temperature of the gaseous stream is in the range of about 600° to 950° F. If one desires to disperse the platinum group metal during this operation as well as deposit the chloride, the gas temperature is advantageously maintained in the range of about 800° to 950° F., whereas if platinum group metal crystallite dispersion is not desired in this step of the operation the chloride addition can be accomplished at lower temperatures of the order of about 600° to 750° F. The total pressure of the system during this gas treatment is usually about 150 to 500 pounds per square inch gauge (p.s.i.g.), and is preferably about 250 to 350 p.s.i.g.

During contact of the regenerated catalyst with the chlorine-containing gaseous stream, deposition of the chloride component apparently occurs primarily in the initial portion of the catalyst bed. When the treatment begins the catalyst often has a surface area of about 150 to 250 square meters per gram and a chloride content of about 0.05 to 0.8 weight percent, and at least about 0.2 weight percent less than when in the virgin state, more often at least about 0.4 weight percent less. During the chloride deposition the amount of chloride added, which is a function of the amount of chlorine in the gaseous stream and the time of contact is such that at least about 0.2, preferably at least about 0.3, weight percent chlorine or chloride, is added based on the total catalyst inventory in the bed or beds treated. After the subsequent chloride distribution the catalyst in the bed on an average basis contains about 0.4 to 1 weight percent chloride, with the chloride addition and distribution treatments usually ad;ing at least about 0.2, preferably at least about 0.3, weight percent chlorine or chloride to the catalyst. The time of chlorine addition is such as to accomplish the desired chloride addition. Generally, a relatively short period of deposition is desired since the principal goal is to deposit the chloride in the first portion of the catalyst bed without undue contact with water vapor. The treatment with the chlorine-containing gaseous stream often continues with respect to a given catalyst bed for a time of up to about 4 hours, preferably less than about 3 hours or even less than about 1 hour. By limiting this time and the amount of water present during chloride deposition, subsequent distribution of this component can be accomplished without unduly extended contact of the catalyst with the chlorine-containing gas stream at the elevated treating temperatures which can cause considerable damage to the catalyst, e.g., by a decrease in surface area.

Upon completion of the chloride addition to the catalyst bed, it is further contacted with a gaseous stream composed predominantly of inert gas and containing a small amount of oxygen. This contact is under conditions in the ranges which can be employed during the chloride deposition, but without the addition of a chlorine-containing material to the treating gas and with the requirement that water vapor be in the gas. It is believed that as a result of this further gas contact, distribution of the added chloride component through the major portion of the bed is accomplished. Thus, the temperature of the gas can be in the range of about 600° to 950° F., preferably about 800° to 950° F. when dispersion of the platinum group metal is desirable. The total pressure is generally about 150 to 500 p.s.i.g., preferably about 250 to 350 p.s.i.g., while the water vapor partial pressure does not exceed 0.8 p.s.i.a. and the water vapor content of the gaseous stream is often at least about 100 p.p.m. or even at least about 500 p.p.m. The oxygen content of the gaseous stream is such that the oxygen partial pressure is about 3 to 100 p.s.i.a., preferably about 5 to 50 p.s.i.a. The time period of chloride distribution step is such as to give an adequate distribution of the chloride through the catalyst bed and it generally exceeds about 2 hours in length, and is preferably greater than about 4 hours in length. The length of time of the chloride distribution treatment is preferably longer than the chloride deposition step.

The total amount of water vapor contacting the catalyst during the chloride deposition and distribution steps is such that excessive chlorine is not lost from the catalyst bed in the gaseous effluent nor is there undue damages, if any, to the catalyst structure. The major portion of the chlorine should remain in the catalyst bed and preferably at least about 70 mol percent of this component should be retained by the bed. As previously noted, excessive chlorine loss can give rise to the corrosion of processing equipment and involves an unnecessary expense.

In terms of total water contact the chloride deposition and distribution steps are limited in time such that the total water vapor contact with the catalyst bed throughout both of these operations is not excessive. The amount of water vapor that can be tolerated without undue damage to the catalyst varies with the temperature of the treatment. For instance, it is preferred that at about 900° F. for both the chloride deposition and chloride distribution steps, the total amount of water vapor in the gas contacting the catalyst bed not exceed about 4 weight percent of the catalyst, while at about 700° F. it is preferred that this amount not exceed about 12 weight percent based on the catalyst.

The total amount of water vapor which contacts the catalyst during the chloride deposition and distribution steps of the method of this invention depends on the temperature of such treatments. The approximate minimum amount of this total water vapor based on the weight of the catalyst is expressed by the relationship:

Weight percent total water vapor (WWV) =
$0.62 \times 10^{-3} \times e^{9800/t}$, while the approximate maximum amount of this total water vapor based on the weight of the catalyst is defined as follows:
$WWV = 2.67 \times 10^{-3} \times e^{9800/t}$. Also, $t$ is the temperature of the treating gas in degrees Rankine.

During the chloride deposition treatment of the method of the present invention a suitable chlorine source is introduced into the treating gas. Molecular chlorine or a variety of chlorine-containing compounds can serve as the source of chlorine as long as the compounds are essentially in the vapor state under the treating conditions. From a handling and measuring standpoint normally liquid, chlorine-containing agents are preferred, for instance, carbon tetrachloride. Other chlorine-containing compounds which can be employed in the method of this invention include methylchloride, trichloroethylene, ethylenedichloride, and other decomposable chlorine-containing compounds. Often where the chlorine-containing compound is organic it has from one to three atoms.

The fixed catalyst beds treated in accordance with this invention are generally at least about 1 foot in depth in the direction of gas flow, frequently this depth will not exceed about 25 to 30 feet and more often is of the order of about 5 to 20 feet. The shorter flow depths are generally encountered in radial-type reactors where the gas flow is between the periphery of the reactor and its central portion.

The catalyst employed in the process of the present invention contain as previously noted, a small, catalytically effective amount of platinum group metal promoter supported by an essentially alumina base and the catalyst which is disposed in a fixed bed is of macrosize. The platinum group metal is often about 0.05 to 2 weight percent of the catalyst, preferably about 0.3 to 1 weight percent. Platinum is the most common and preferred metal in such catalysts but other platinum group metals such as palladium and rhodium can be used. When the catalyst is in a virgin state the platinum group metal is for the most part undelectable by X-ray diffraction analysis, which indicates that if the platinum group metal is present in the catalyst as elemental metal its crystalline sizes are less than about 50 A. A common method of providing the platinum group metal in the catalyst is by contact of the alumina support, either in hydrous or in calcined form, with an aqueous solution of a chlorine-containing compound, for instance chloroplatinic acid. In this manner chlorine is incorporated in the catalyst for instance, in amounts of about 0.2 to 2 weight percent, preferably about 0.3 to 1 weight percent. The chlorine component can also be added to the catalyst from a source other than the compound supplying the platinum group metal.

The alumina support in the catalyst of the present invention is composed to a major extent of gamma-family alumina modifications derived by the activation or calcination of alumina trihydrates and often having surface areas of at least about 150 square meters per gram. These gamma-family alumina modifications include among others, gamma and eta aluminas. U.S. Pat. No. 2,838,444 discloses this type of alumina support and its use in platinum group metal catalysts having surface areas in the range of about 350 to 550 square meters per gram, while in U.S. Pat. No. 2,838,445 there is described platinum group metal catalysts made from predominantly trihydrate alumina precursors, the catalysts having surface areas in the range of at least about 150 square meters per gram. These catalysts are suitable for use in the present invention, especially the higher area catalysts of U.S. Pat. No. 2,838,444. As stated, the alumina precursors predominate in trihydrates which may contain one or more of the bayerite, gibbsite or nordstrandite (previously called randomite) forms and preferably a major amount of the trihydrate is composed of bayerite or nordstrandite and in catalysts derived therefrom the calcined aluminas have been found to contain eta alumina. It is also advantageous that hydrous alumina precursor contain about 65 to 95 percent of the trihydrate with the essential balance being composed of one or both of the alumina monohydrate, boehmite, or amorphous hydrous alumina. The gamma-family alumina modifications which can be referred to as activated forms of alumina result from the calcination, preferably in an oxygen-containing gas, of the hydrous alumina precursor. Calcination can be conveniently conducted at temperatures of the order to about 700° to 1200° F. or more and this operation can be controlled to give a final catalyst of desired surface area. At an appropriate stage in the manufacture of the catalyst, the particles can be formed into macrosize from finely divided or fluidized catalyst types. The macrosize particles frequently have diameters in the range of about one sixty-fourth to three-eighths inch, inch. preferably about one-sixteenth to one-fourth inch, and if not spherical, the particles usually have lengths of about one sixty-fourth to 1 inch or more, preferably about one-eighth to one-half inch.

The calcined catalysts treated in accordance with the process of this invention can be employed in a variety of hydrocarbon conversions conducted at elevated temperatures and under a reducing atmosphere which is usually provided by the presence of a molecular hydrogen-containing gas. Before use, or reus after regeneration and reactivation, the catalyst can be reduced by contact with a molecular hydrogen-containing gas at elevated temperatures. The catalysts whose reactivation is of primary concern in this invention are those that have been deactivated through the deposition of carbon and loss of chlorine, and possibly through platinum group metal crystalline growth while being employed in the reforming of gasoline boiling range hydrocarbons whether they boil in a broad or narrow temperature range. In such operations a straight run naphtha, a fraction thereof or other similar boiling range hydrocarbons whose aliphatic constituents are for the most part saturated and which may contain some aromatics, is converted to a product having greater aromaticity and higher octane rating. Relatively pure aromatics can be separated from the products or if the feed is of sufficiently narrow boiling range, a relatively pure aromatic may be the predominantly normally liquid product from the operation. Such naphtha reforming systems are usually conducted at processing conditions which include reactor inlet temperatures of about 825° to 1,000° F. and total pressures of about 150 to 600 p.s.i.g., preferably about 200 to 500 p.s.i.g. During the operation hydrogen containing effluent gas is recycled to the reaction system, the latter normally having a series of adiabatic fixed bed catalyst reactors preceded by feed heaters as previously discussed. The recycle gas ratio is usually such to provide about 3 to 30 moles of gas per mole of hydrocarbon feedstock. Also the hydrocarbon charge is often passed to the reactor system at a rate such that the overall space velocity is about 0.5 to 15 WHSV (weight of hydrocarbon per weight of catalyst per hour), preferably about 1 to 10 WHVS.

In many naphtha reforming units in commercial operation at the present time the hydrocarbon feed has a clear or unleaded research octane rating (RON) in the range of about 30 to 50, and the severity of the reaction conditions are such that the normally liquid reformate or product has a RON of at least about 90 or even at least about 95 or 100. In such operations, the reactor inlet temperatures are often in the range of about 875° to 975° F., preferably at least about 920° F., while the total pressure of the system is about 200 to 500 p.s.i.g. In this relatively severe reaction system reactivation of the catalyst by chlorine addition in accordance with the present invention is of particular advantage.

During use of the catalyst treated in this invention to promote the conversion of hydrocarbons at elevated temperatures, a carbonaceous deposit forms on the catalyst. When the operation is stopped for regeneration by burning, the carbon content of the catalyst is generally above about 0.5 weight percent, often greater than 3 weight percent. Also during the hydrocarbon conversion process there occurs a loss of chlorine from the catalyst. As these effects continue the catalyst loses activity which can be counteracted by increasing the reaction temperature. Eventually however, when the temperature is in the range of about 950° to 1,000° F., especially at about 970° F. and above, it becomes inadvisable to increase the temperature further, otherwise permanent damage to the catalyst may result. The catalyst is then generated by carbon burn-off which usually improves catalytic activity somewhat and perhaps even sufficiently to warrant reuse of the catalyst without reactivation, for instance by chlorine addition.

In any event in the process-regeneration scheme, whether conducted for one cycle or for two or more cycles, it becomes desirable to increase the chlorine content of the catalyst and in some cases to decrease the size of the platinum group metal crystallites of the catalyst. At this point following the removal of carbon from the catalyst, the method of the present invention can be employed. During regeneration by burning, the carbon level is often reduced to below about 0.5 weight percent, preferably below about 0.2 weight percent. This burning is conducted through contact of the catalyst with an oxygen-containing gas and generally the amount of oxygen is controlled to maintain the temperature of the catalyst below about 1,000° F., preferably within the temperature range of about 700° to 850° F. The pressure maintained during burning is generally elevated, for instance about 100 to 500 p.s.i.g. The controlled burning is usually initiated with an inert gas containing a small amount of oxygen, for instance, up to about 1 mole percent and preferably with an oxygen partial pressure of at least about 0.2 p.s.i.a. When the bulk of the carbon has been removed from the catalyst by a gas containing the relatively low concentration of oxygen, the amount of oxygen can be increased to insure the major portion of the carbon has been removed from the catalyst without exceeding the desired temperatures. This type of treatment is exemplified by one or more burn-throughs of the catalyst bed at about 800° to 850° F. and about 100 to 500 p.s.i.g., with a gas containing above about 1 to about 3 or somewhat greater mole percent oxygen. Other suitable carbon-burning procedures can be employed as long as the temperatures are controlled and the carbon level of the catalyst is adequately lowered.

Especially where the crystallite size of the platinum group metal on the catalyst is to be reduced, the catalyst can, after carbon burn-off or even after chloride reactivation, be contacted with an oxygen-containing gas at a temperature of about 800° to 1,000° F., preferably about 850° to 950° F., and, if desired, an elevated pressure such as about 100 to 500 p.s.i.g. This treatment has been referred to in the art as an air soak and the oxygen content of the gas is usually greater than that present in the gas employed for carbon burn-off. Thus, the oxygen content of the gaseous stream employed for air soaking is often at least about 5 mole percent with there having been found no particular reason for increasing the gas content above about 20 mole percent. The air soaking period is generally at least about 1 hour and is usually continued for several hours, for instance, in the range of about 5 to 24 hours. Suitable regeneration and air soaking procedures for the catalyst of the present invention are disclosed in U.S. Pat. No. 2,922,766, herein incorporated by reference.

The present invention is illustrated by the following examples.

EXAMPLE I

A simulated reactor was constructed of ⅜-inch OD stainless steel tubing wound in a coil 11-inch in length and having 18 turns. The catalyst was a 1/16-inch extrudate commercial catalyst of the type disclosed in U.S. Pat. No. 2,838,444 which had become deactivated by use in the reforming of straight run petroleum naphtha to high octane gasoline components, and then regenerated by carbon removal. Typically a virgin catalyst of this type contains about 0.6 weight percent platinum on alumina derived from a hydrous alumina mixture of about 75 percent trihydrate which is predominantly bayerite and nordstrandite, the essential balance being boehmite and amorphous hydrous alumina. Such catalysts in the calcined, virgin state usually have a surface area of about 400 to 500 square meters per gram and a chloride content of about 0.7 weight percent derived from the use of chloroplatinic acid as the source of platinum. The used catalyst had a surface area of 163 m.²/g. and analyzed 0.13% Cl.

The coil reactor was loaded with the foregoing described catalyst and placed in a furnace maintained at 900° F. A gas flow system designed to deliver a variable mixture of nitrogen and dry air was connected to the coil. In addition, facilities were added to control and monitor the moisture content of the entering nitrogen gas stream. In the system a portion of the prepurified nitrogen flow passed through a water saturator and was recombined with the remaining portion of the nitrogen flow that did not go through the saturator. The moisture content of the recombined stream was monitored and the portion of nitrogen passed to the saturator was regulated accordingly to give a gas stream of desired water vapor content. To the recombined nitrogen stream was added enough dry air to give the desired oxygen content in the total gas stream and the resulting gaseous mixture was sent to the reactor coil described above. $CCl_4$ was used as a source of chloride and was injected by an hydraulic pump at a constant rate through capillary tubing into the gas stream at a point just before the catalyst in the reactor coil.

Loading of the coil was accomplished by slowly dropping catalyst (crushed to 12–20 mesh) into the top of the coil while rotating by hand, and with the coil set on a paper jogger. By this means 40–45 g. of catalyst was introduced into the coil. After setting the indicated conditions of catalyst temperature, pressure, flow rates of nitrogen and air, and moisture content, $CCl_4$ addition was started, at a preset rate, until 0.4 percent by weight Cl based on the total catalyst had been added. After a purge during which all gas flows remained as in the $CCl_4$ addition step but throughout which there was no $CCl_4$ addition, the system was depressurized, and the catalyst cooled and removed in sections for weighing and chloride analyses. Water content of the gas flow was controlled and monitored through the entire process. System temperature and pressure were maintained near 900° F. and 350 p.s.i.g., respectively, and the gas flow rate at 17.2 s.c.f./hr. throughout the carbon tetrachloride addition and purge. The $O_2$ content of the gas throughout this operation was 4 mol percent.

Run 1 in which there was no purge illustrates the action of the $CCl_4$ addition step wherein almost all of the chloride has remained in the first 20 percent of the bed. In runs 2 and 3 there was a purge but insufficient total water was used and most of the catalyst bed contained little, if any, additional chloride. Runs 4 and 5 illustrate the operation of the present invention in which adequate chloride distribution is obtained without excessive exiting of chloride from the reactor. Also, run 5 indicates that if purging continues too long at higher water contents in the purge gas the initial portions of the catalyst could become too low in chlorine.

EXAMPLE II

Another commercially manufactured platinum-alumina catalyst of the type employed in example I was used, regenerated, reactivated, and reused according to the following procedure. The catalyst was used in the reforming of petroleum naphtha in a system having a plurality of adiabatic fixed catalyst bed reactors, each preceded by a feed heating means. The naphtha typically analyzed by volume approximately 47 percent paraffins, 40 percent naphthenes, and 13 percent aromatics and the $C_5$ to end point gasoline product had an octane rating of about 90 to 91 (RON). Reforming was conducted at the approximate processing conditions of 920° to 960° F. feed inlet temperatures for the reactors whose catalyst was later reactivated, 400 p.s.i.g. total pressure, recycle gas to naphtha mole ratio of 5/1 and 2.5 overall WHSV space velocity.

During the first 10 weeks after initiating the operation with virgin catalyst the yield of $C_5$ to end point reformate was on the average about 2.3 volume percent below what would have

TABLE I

| | $CCl_4$ addition | | | Purge | | Chloride distribution | | Average percent Cl | Total water [1] |
|---|---|---|---|---|---|---|---|---|---|
| | Time, hour | $H_2O$, p.p.m. | $H_2O$ Cl | Time, hours | $H_2O$, p.p.m. | Percent of catalyst bed | Percent Cl | | |
| Run: | | | | | | | | | |
| 1 | 1 | 250 | 1.0 | 0 | | First 20<br>Next 60<br>Last 20 | 1.07<br>0.18<br>0.13 | 0.35 | 0.17 |
| 2 | 1 | 160 | 0.66 | 2 | 160 | First 6<br>Next 24<br>Next 35<br>Last 35 | 1.67<br>1.00<br>0.19<br>0.18 | 0.49 | 0.34 |
| 3 | 1.1 | 210 | 0.87 | 6 | 210 | First 12<br>Next 24<br>Next 20<br>Next 20<br>Last 24 | 0.91<br>0.61<br>0.17<br>0.16<br>0.14 | 0.36 | 1.2 |
| 4 | 2.6 | 310 | 3.04 | 5 | 310 | First 19<br>Next 22<br>Next 21<br>...do<br>Last 17 | 0.82<br>0.82<br>0.55<br>0.17<br>0.15 | 0.53 | 1.18 |
| 5 | 1.2 | 310 | 1.35 | 5.9 | 540 | First 27<br>Next 25<br>Next 23<br>Last 25 | 0.59<br>0.76<br>0.74<br>0.17 | 0.56 | 2.9 |

[1] Percent of catalyst ($CCl_4$ addition plus purge).

been expected from a virgin catalyst of this type. In the 11th to 15th weeks this yield was about 3.5 volume percent below the expected performance of the virgin catalyst. During the 21st and 22nd weeks of reforming this wield was about 6 volume percent below the expected performance of the virgin catalyst. The catalyst was then regenerated and reactivated according to the method of the present invention. Regeneration was by carbon burn-off at a total pressure of about 350 p.s.i.g., initially using a gas containing about 0.6 mol percent oxygen while maintaining the maximum catalyst temperature at about 850° F. Further burning of the catalyst was made with gas of increased oxygen content while keeping the temperature below about 850° F. and the final gas contained about 2 mol percent oxygen.

The catalyst beds in three reactors in he system were then reactivated by the addition of chloride. The chlorine-containing material was deposited first in the catalyst bed of the last of the three reactors, then in the bed of the intermediate of the three reactors, and finally in the bed of the first of the three reactors. The first and second of the three reactors had gas flow paths through their respective catalyst beds of about 5 feet, while the path of gas flow through the catalyst bed of the last of the three reactors was about 12 feet. Reactivation was started in the last of the three reactors by adding about 60 parts per million by weight (p.p.m.) carbon tetrachloride to a recirculating gas passing through all reactors at about 700° F., and 350 p.s.i.g., and containing about 6 mol percent oxygen and 1,300 p.p.m. water vapor. Shortly after beginning the chloride addition the gas analyzed 1,500 p.p.m. water. This treatment was continued for about 2.5 hours after which the chloride addition to the last reactor was stopped.

The carbon tetrachloride was then added in the same amount to the gas stream passing into the inlet of the second of the three reactors for about 1 hour and then stopped, followed by addition of carbon tetrachloride in the same amount to the gas stream passing into the inlet of the first of the three reactors for about 0.5 hour, and then stopped. During the chloride addition the oxygen content of the circulating gas stream was about 5 to 6 mol percent, and the water vapor content of the gas was about 1,500 to 1,600 p.p.m. The temperature of the treating gas was about 700° F. throughout the chloride addition and sufficient carbon tetrachloride was added to raise the chlorine (Cl) content of the total catalyst in the three reactors by about 0.4 weight percent. After all of the carbon tetrachloride was added circulation of the gas was continued through the three reactors for about 7 hours which would continue to distribute chloride through the catalyst beds and the temperature of the gas stream was allowed to cool to about 400° F. during this period.

After purging with nitrogen the catalyst was contacted with hydrogen at 600° F. and 200 p.s.i.g. for 18 hours and then reduced in hydrogen for 2 hours at 900° F. Subsequent use of the resulting catalyst in reforming naptha under essentially the same conditions as employed in the period prior to regeneration showed that in the first 10 weeks the deviation of $C_5$ to end point gasoline yield was on the average considerably less than 0.5 volume percent below expected virgin catalyst performance, and even after 15 weeks of operation this yield was only about 0.8 percent below expected virgin catalyst performance. These values show a marked improvement in catalyst performance compared with first cycle operation. The hydrocarbon feedstock to the system was changed somewhat at this point but after about 20 weeks of operation following the regeneration-reactivation treatment, the $C_5$ plus yield was still only about 2 volume percent below expected virgin catalyst performance.

It is claimed:

1. A method for reactivating a fixed bed of platinum group metal promoted alumina catalyst of macrosize which has been deactivated by use in conversion of hydrocarbons at elevated temperature in the present of molecular hydrogen, said catalyst having deposited thereon a carbonaceous material, the alumina of said catalyst being derived by calcination of a hydrous alumina precursor containing a major portion of alumina trihydrate, which consists essentially of regenerating said catalyst by burning carbonaceous deposit from said catalyst through contact with an oxygen-containing gas, adding and depositing chloride to he initial portion of the catalyst bed by contacting regenerated catalyst having a chloride content of about 0.05 to 0.8 percent with a gaseous stream consisting essentially of inert gas, oxygen and vaporous chlorine-containing agent which supplies and deposits chloride to the initial portion of the catalyst bed, said gaseous stream containing a mole ratio of water vapor to chloride of 0 to about 10:1, said contacting for chloride addition being at a temperature of about 600° to 950° F., at an oxygen partial pressure of about 3 to 100 p.s.i.a. and a water vapor partial pressure of 0 to about 0.8 p.s.i.a. and said contacting for chloride addition continuing until at least about 0.2 percent chlorine has been added to the catalyst based on the total weight of catalyst in said bed and subsequently distributing chloride through a major portion of said bed until the catalyst bed has about 0.4 to 1 percent chloride based on the total weight of catalyst in said bed by contacting said catalyst with a gaseous stream consisting essentially of inert gas, oxygen and at least about 100 p.p.m. water vapor and in the absence of addition of chloride-containing agent to the gaseous stream, whereby such distributing with said gaseous stream produces a loss of chloride of not more than about 30 mole percent, said subsequent contacting being at a temperature of about 600° to 950° F., an oxygen partial pressure of about 3 to 100 p.s.i.a. and a water vapor partial pressure of up to about 0.8 p.s.i.a. with the proviso that the amount of water vapor present in the gaseous stream throughout said chloride addition and distributing steps is such that during the total time of said chloride addition and distributing steps the total amount of water vapor contacting the catalyst is about $$0.62 \times 10^{-3} \times e^{9800/t}$$

to about:

$$2.87 \times 10^{-3} \times e^{9800/t},$$

$t$ being the temperature of the treating gas in degrees Rankine.

2. The method of claim 1 wherein the catalyst is deactivated by use in reforming gasoline boiling range hydrocarbons at a reactor inlet temperature of about 875° to 975° F. and a total pressure of about 200 to 500 pounds and the product has an octane rating of at least about 90 research octane numbers.

3. The method of claim 2 wherein the temperatures of said contactings are about 800° to 950° F.

4. The method of claim 1 in which the gaseous stream containing the chlorine-containing agent has a water to chlorine mole ratio of at least about 1:1 and the water vapor content of the gaseous stream is at least about 500 p.p.m. by volume.

5. The method of claim 4 on which the gaseous streams have an oxygen partial pressure of about 0.5 to 5 p.s.i.a., and the length of the contact with the gaseous stream to which no chlorine-containing material is added is at least about 4 hours.

6. The method of claim 5 wherein the catalyst is deactivated by use in reforming gasoline boiling range hydrocarbons at a reactor inlet temperature of about 875° to 975° and a total pressure of about 200 to 500 pounds and the product has an octane rating of at least about 90 research octane numbers.

7. The method of claim 5 wherein the temperatures of said chloride addition and distribution steps are about 800 to 950° F.

8. The method of claim 6 in which the catalyst contacted with the chlorine-containing agent has a surface area of about 150 to 250 square meters per gram.

9. The method of claim 8 in which the chlorine-containing agent is carbon tetrachloride.

10. The method of claim 9 wherein the temperatures of said chloride addition and distribution steps are about 800° to 950° F.

* * * * *

PO-1050
(5/69)

UNITED STATES PATENT OFFICE
CERTIFICATE OF CORRECTION

Patent No. 3,637,524  Dated January 25, 1972

Inventor(s) M.F.L. Johnson and S. L. Graff

It is certified that error appears in the above-identified patent and that said Letters Patent are hereby corrected as shown below:

Column 10, line 39, the number "$2.87 \times 10^{-3} \times e^{\frac{9800}{t}}$," should read ---$2.67 \times 10^{-3} \times e^{\frac{9800}{t}}$,---

Column 10, line 58 "975°" should read ---975°F.---

Signed and sealed this 29th day of August 1972.

(SEAL)
Attest:

EDWARD M. FLETCHER, JR.
Attesting Officer

ROBERT GOTTSCHALK
Commissioner of Patents